Inventors
JAMES D. GREIG &
ALFRED J. BAILEY
BY Tweedale & Gerhardt
Attorneys

Inventors
JAMES D. GREIG &
ALFRED J. BAILEY
BY
Tweedale & Gerhardt
Attorneys

United States Patent Office 3,494,427
Patented Feb. 10, 1970

3,494,427
AGRICULTURAL IMPLEMENT WITH MEANS FORCING TOOL TO CONTROLLED DEPTH
James D. Greig, Warwick, and Alfred J. Bailey, Berkswell Village, near Coventry, England, assignors to Massey-Ferguson Services N.V., Curacao, Netherlands Antilles
Filed Sept. 8, 1966, Ser. No. 577,931
Claims priority, application Great Britain, Sept. 17, 1965, 39,804/65
Int. Cl. A01b *63/111, 63/10*
U.S. Cl. 172—316                5 Claims

ABSTRACT OF THE DISCLOSURE

A seed drill with a frame, a container for seed mounted on the frame, a series of spaced furrow openers mounted on the frame and means connected to the hydraulic system of a tractor to control the depth to which the furrow openers penetrate into the soil.

---

This invention relates to an agricultural implement having a soil-working member, especially a seed and/or fertilizer drill.

In certain circumstances at present, difficulties arise due to the fact that the soil-working member does not penetrate the soil or does not do so to the required depth. Such circumstances may arise, for example, when the implement is a seed drill, and the member is a furrow opener, and the seeding operation is being carried out by the so-called "direct seeding" method in which the soil is chemically pre-treated to destroy living plant growth but is untilled.

An object of the present invention is to provide an implement in which this difficulty is overcome or reduced.

According to the present invention there is provided an agricultural implement comprising a frame having a ground-engaging support and which is adapted for connection to the drawbar of a tractor, a soil-working device carried by a member pivotally connected to said frame and moveable relative thereto to raise and lower the soil-working device, and adjustable means carried by said frame and connected to said member and adapted to be operable by a selectively variable loading force so as to transmit said force to said member and urge said soil-working device into the soil.

Embodiments of the invention as applied to a seed drill will now be described, by way of example, with reference to the accompanying drawings, in which.

Figure 1:
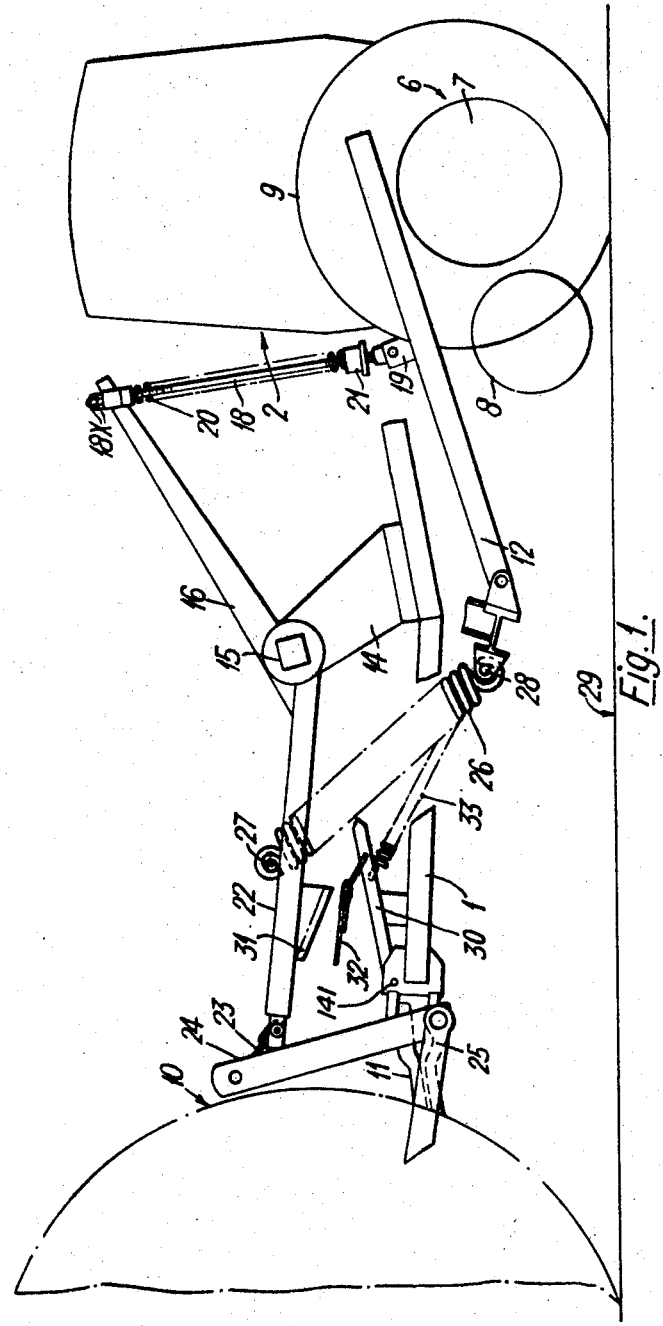
FIG. 1 is a side view of one embodiment of a seed and fertilizer drill according to the present invention attached to a tractor of which only a small portion is shown, the soil-working member being shown in an out-of-use position.
Figure 2:
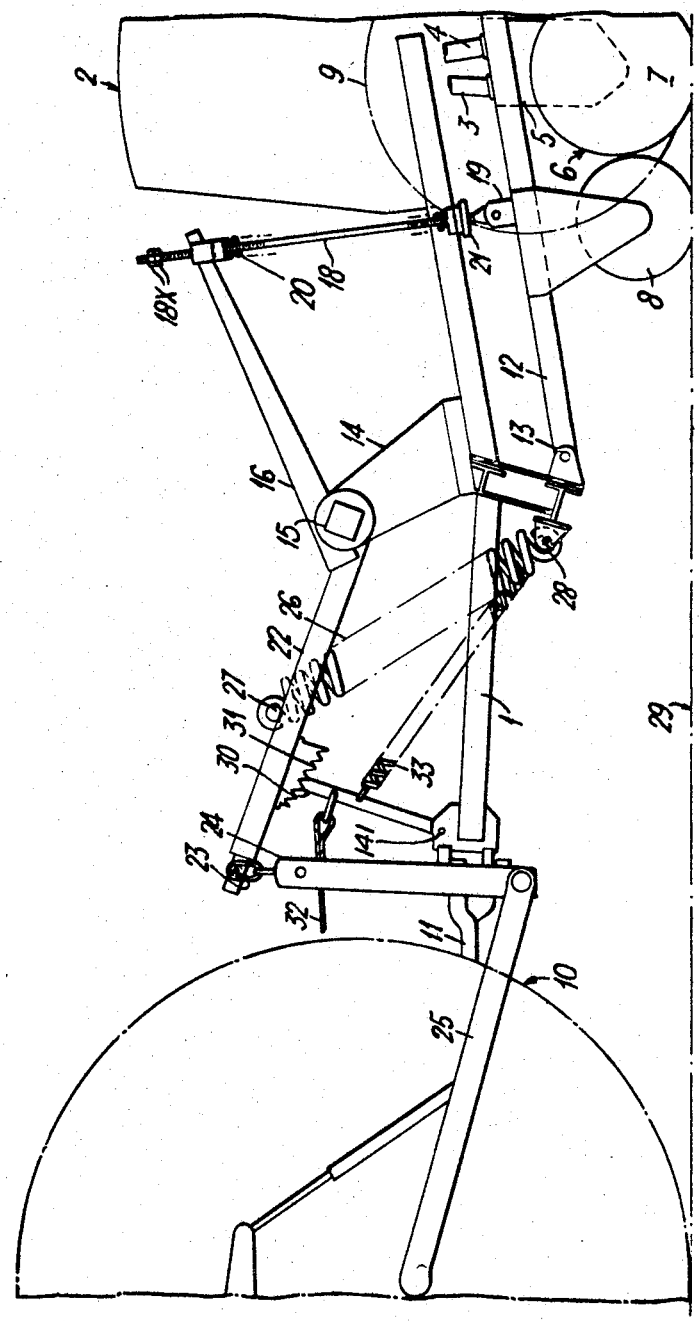
FIG. 2 is a view corresponding to FIG. 1, showing the soil-working member in an in-use position.
Figure 3:
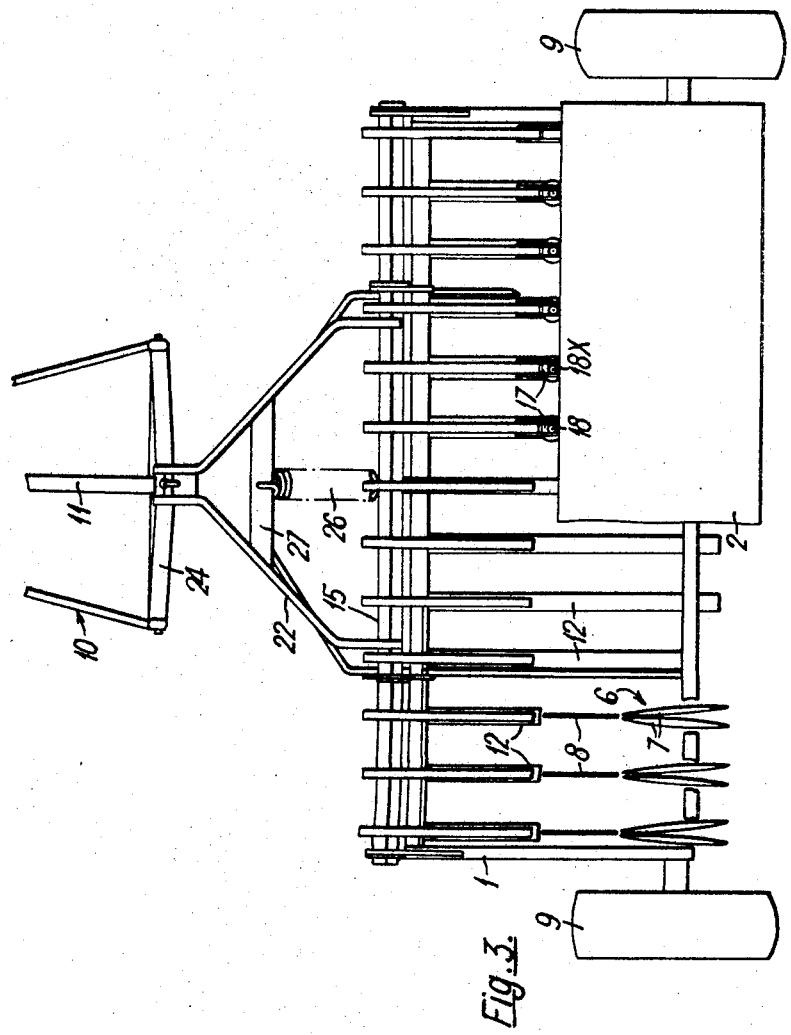
FIG. 3 is a plan view corresponding to FIGS. 1 and 2.

Referring to FIGS. 1 to 3 of the drawings, a seed and fertilizer drill consists generally of a main frame 1, a container 2 mounted on the frame 1 and having compartments for seed and fertilizer which feed through tubes 3, 4 to chutes in casings 5 from which they pass to the soil, a series of laterally spaced furrow openers 6 in the form of opposed pairs of disc coulters 7, and slit-forming disc coulter means 8, one in front of each furrow opener 6.

The main frame 1 is supported at its rear end on ground wheels 9 and is attached at its front end to a tractor 10 by a drawbar 11. The series of furrow-openers 6 and casings 5 are carried at the rear ends of a corresponding series of members 12 which at their front ends are pivotally connected to the frame 1 through a horizontal transverse shaft 13.

The main frame 1 carries lugs 14 supporting an axially pivotal cross shaft 15 to which are secured the front ends of a series of rearwardly extending lever arms 16. At its rear end, each lever arm 16 has a slot 17 (FIG. 3) through which the upper end of a rod 18 passes. The lower end of each rod 18 is pivotally connected to a lug 19 on each member 12. Each rod 18 is surrounded by a compression spring 20 which at its upper end abuts the underside of the slotted rear end of the lever arm 16, and its lower end abuts a cap 21 which is screw-adjustable along the rod 18 so that the tension in each spring 20 may be varied. The rod 18 and the compression spring 20 form a yieldable resilient link connecting the lever arm 16 to the lug 19 on each of the members 12. Stop nuts 18X are provided on the rod 18, these nuts 18X being engageable by the lever arm 16 so that the latter may raise the member 12. The stop nuts 18X are adjustable along the rod 18 so as to vary the height to which the member 12 may be raised by the lever arm 16.

The shaft 15 is fixed to the rear end of a lever frame 22, and the front end of the lever frame 22 is connected by a short chain 23 to the upper end of a link in the form of an upright frame 24 pivotally connected at its lower end to the lower links 25 of the tractor power lift. The lever frame 22 forms an extension of the lever arms 16 and thereby forms a plurality of long levers which are pivoted about the axis of shaft 15 at a point between their free ends. One free end of each lever is attached to the rod 18 and the other end is attached to the chain 23.

Tension spring means 26 are connected at their upper end to a cross bar 27 on the lever frame 22 and at their lower end to the main frame 1, at 28, and are of sufficient strength to effect raising of the coulters 7 to an out-of-use position clear of the ground as shown in FIG. 1.

In operation the links 25 are raised by the tractor power lift so that the shaft 15 is rotated clockwise in the drawings by the frames 24, 22 and the chain 23. This effects downward pivoting of the members 12 until the coulters 7 engage the soil. Then the spring means 20 are compressed by an amount determined by upward travel of the links 25 so that the coulters 7 are thus loaded by an amount determined by the power lift and penetrate the soil (FIG. 2) of which the top surface is indicated at 29 in FIGS. 1 and 2.

On level ground, this provides adequate operating conditions, but since normally there would be relative pitching motions between the tractor and drill, a prop 30 is inserted between the drill and the frame 22. The prop 30 is pivotally mounted on pin 141 at its lower end on the frame 1, and at its upper end engages in a selected one of a series of notches of a toothed rack on the lever frame 22. The prop 30 is movable in one direction by a cable 32 under control of the tractor driver from the driving seat, and in the other direction by a spring 33 connected at one end to the prop 30 and at its other end to the frame 1. In the in-use position shown in FIG. 2, the chain 23 is not slack. This is not disadvantageous, however, since the power lift is operated by a single acting ram and the system may be set so that it is free to rise and fall with the links 25 as necessary.

The embodiments shown in FIGS. 4 and 5 correspond basically to the embodiment described with reference to FIGS. 1 to 3; and only those parts which are different will be described in detail. Parts similar to those in FIGS. 1 to 3 are referred to by the same numerals with the addition of the suffix A.

Figure 4:
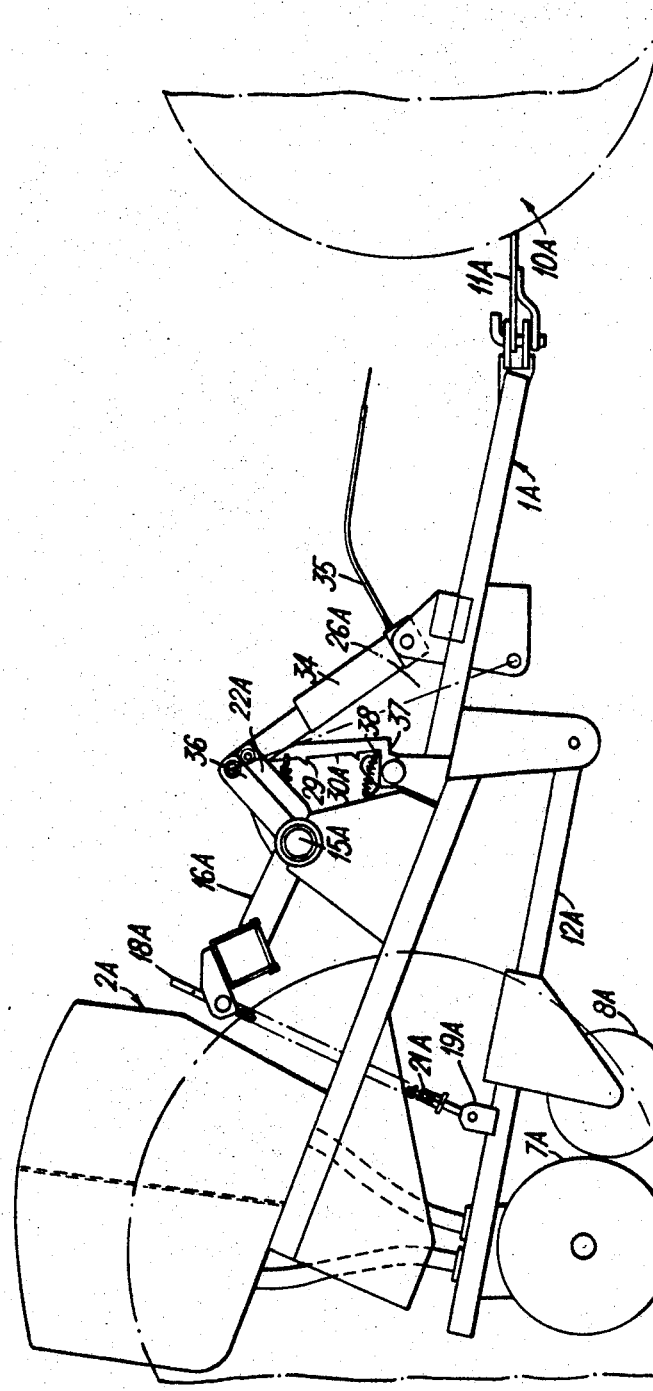
FIGS. 4 and 5 are views corresponding to FIGS. 1 and 3 showing another embodiment.
Figure 5:
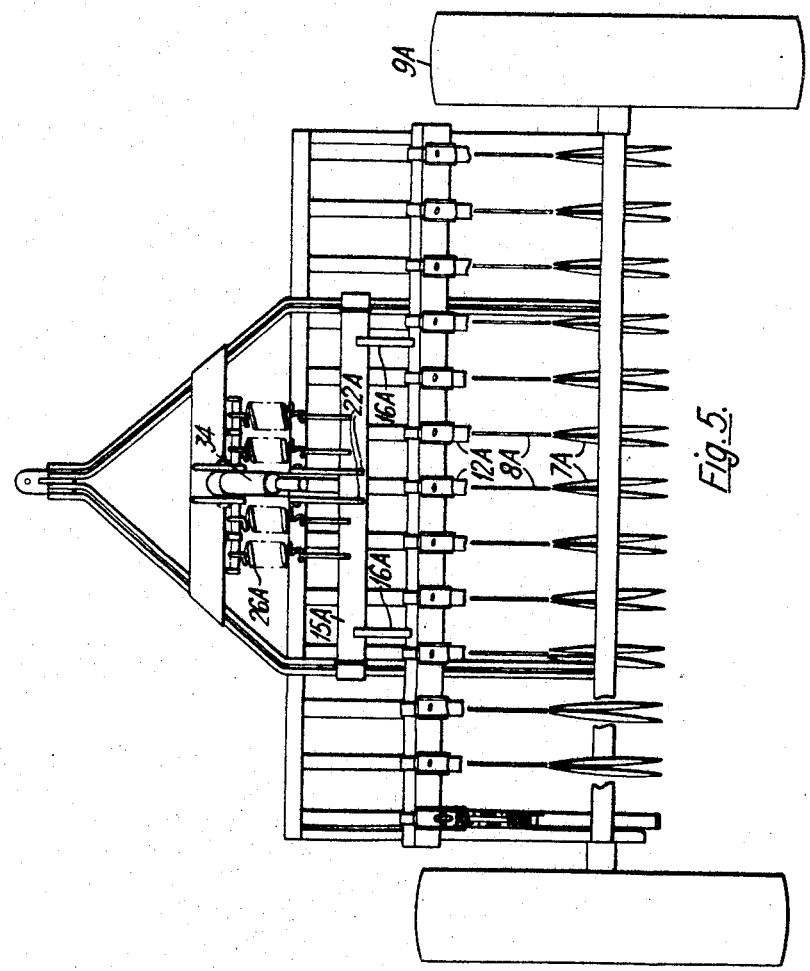

In FIGS. 4 and 5, the main difference is that the lever frame 22 is replaced by lever arms 22A, and the later are raised by a hydraulic jack 34 and not by the lower links of the power lift, the jack being supplied through a tube 35 from the tractor hydraulic system. Also, the springs 26A are connected to the free ends of further lever arms 36 secured at their other ends to the shaft 15A. Although not essential in this embodiment, a prop 30A is provided and it is automatically operated. In FIG. 4, the coulters 7A are in the soil, and the lever arms 22A are supported on the prop 30A. To raise the coulters 7A, the jack is extended so that a lower projection or abutment 37 on the prop contacts a spring latch 38 and puts it over-center. The jack 34 is now released and the assembly is free to pivot clockwise and raise the coulters through the action of the springs 26A. At the end of the stroke, a top projection or lug 29 on the prop 30A engages the latch 38 and resets it ready for the next cycle.

In this embodiment, the springs 26A could be dispensed with and a double-acting jack used instead.

Alternatively, the fixed position of the linkage when in operation can be replaced by a self-adjusting arrangement. In this case the jack 34 is operated from a source of constant pressure so that the total spring force on the coulters 7A is maintained constant despite irregularities in the ground. The constant pressure source may be the "hydraulic" system of a tractor including "pressure control," that is a system in which the hydraulic pressure is automatically maintained constant at a valve which may be manually selected by the operator.

The embodiment shown in FIG. 6 corresponds generally to that described with reference to FIGS. 1 to 3, and only those parts which are different will be described in detail. Parts similar to those in FIGS. 1 to 3 are referenced with the same numerals with the addition of the suffix B.

Figure 6:
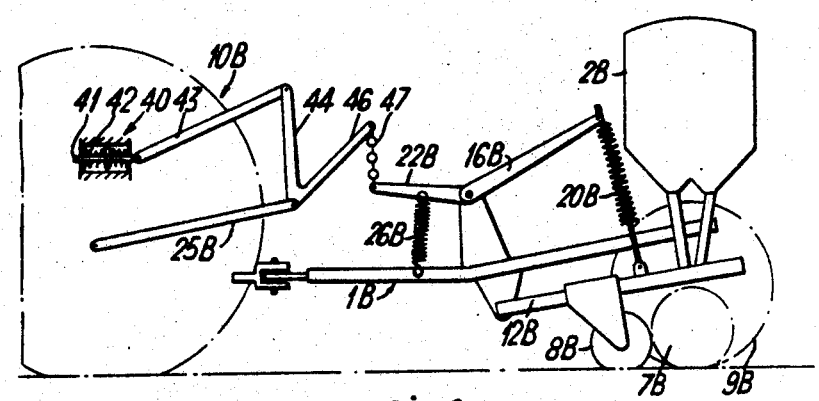
FIGS. 6, 7 and 8 are views corresponding to FIG. 1 to a reduced scale and showing further embodiments

In FIG. 6, the total load on the coulters 7B is sensed by the tractor draft control system, and the position of the links 25B is thus automatically adjusted so as to maintain a constant total load. The draft control system is itself known and need not be described, and only its sensing device 40 is shown which has a slide 41 with a double-acting control spring 42. The slide 41 is connected by a rod 43 to the upper end of one arm 44 of a bellcrank lever or V-frame 45 pivotally mounted on the lower links 25B, and the upper end of the other arm 46 of the V-frame is connected by a flexible link or chain 47 to the front end of the lever frame 22B.

An increased total load on the springs 20B causes the lever arms 16B to pivot upwards so that the sensing device slide 41 moves to the right in FIG. 6 and the consequent signal results in the links 25B being lowered, thus relieving the springs 20B until the set load is again obtained. In a similar manner, a decreased load on the springs 20B results in raising of the links 25B.

Figure 7:
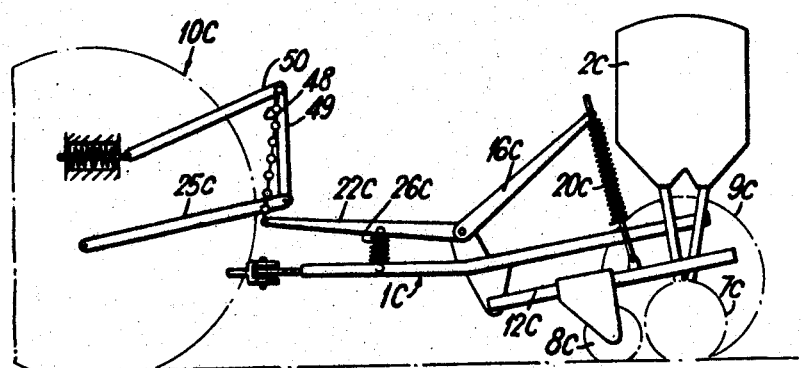

FIG. 7 illustrates an embodiment in which selection of the load is effected by use of the tractor position control for use on level ground or by pressure control, the pressure in the tractor main ram being automatically maintained constant. In the FIG. 7 embodiment which corresponds generally to the FIG. 1 embodiment, the lever frame 22C is extended forwardly and at its front end is supported by a flexible link or chain 48 from the upper end of a linking frame 49 pivotally interconnecting the upper and lower links 50, 25C of the tractor power lift. Other parts in FIG. 7 corresponding to those in FIG. 1 are references with the same numerals and the suffix C.

Figure 8:
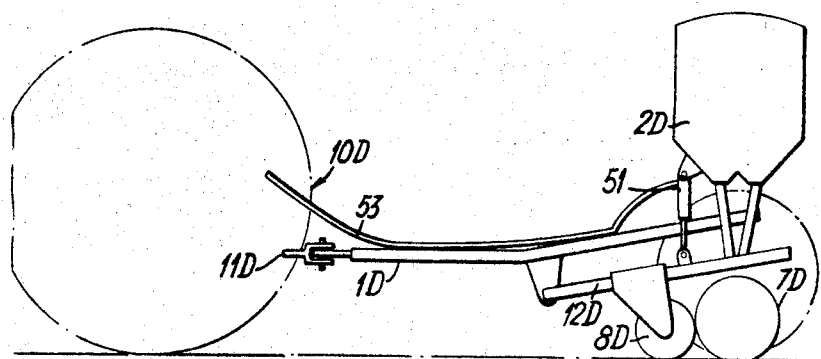
Figure 9:
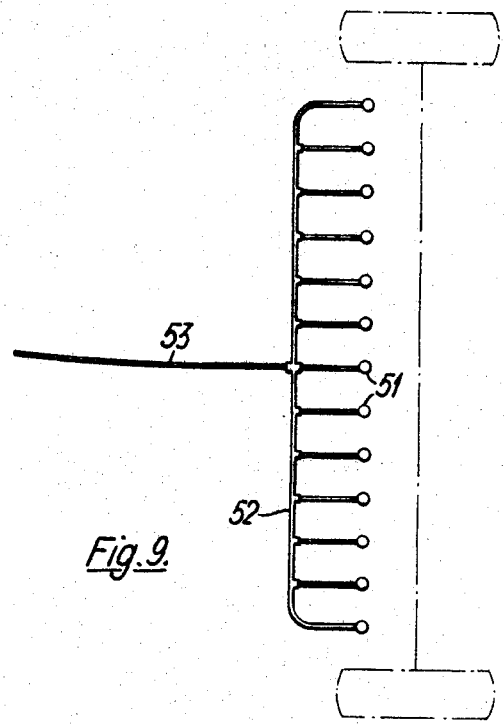
FIG. 9 is a plan view corresponding to FIG. 8.

In the embodiment shown in FIGS. 8 and 9, there is a series of hydraulic jacks 51, one for each coulter 7D. The jacks 51 are connected in parallel by a manifold 52 to a pipe 53 through which the jacks 51 are supplied from a constant hydraulic pressure source on the tractor 10D. Other parts in FIGS. 8 and 9 corresponding to those in FIG. 1 are referenced with the same numerals and the suffix D.

The coulters shown may be of any other suitable form, and the slit-forming coulters may be replaced by blades. The last-mentioned coulters may be successively staggered in the fore-and-aft direction.

The screw adjustment provided on the springs 20 abovementioned enables fine adjustment of tension over a large range, and also enables the initial pressures of all the springs 20 to be set equally.

The invention need not necessarily be limited to a seed drill, but may be applied to any soil-working device which requires to be forceably urged into the soil to effect soil penetration to a depth which may be controlled.

We claim:

1. An agricultural implement comprising a frame having ground-engaging support wheels and being adapted for connection to the drawbar of a tractor, a soil-working device carried by a member pivotally connected to said frame and movable relative thereto to raise and lower the soil working device, means pivotally mounted on the frame and connected to said member by means including a rod and spring which form a yieldable resilient link and connected so that one end of said lever may be raised by a selectively variable hydraulically operated loading force from a power lift of a tractor so as to transmit said force to said member and urge said soil-working device into the soil, and a prop means adapted so as to be movable to a position in which the prop means is effective to hold said lever means from movement relative to said frame in a direction which corresponds with raising of said soil-working device.

2. An agricultural implement according to claim 1, in which said prop means comprise a prop pivotally connected at one end to said frame and movable to a position in which the other end of the prop may engage said lever so as to hold said one end of the latter in a raised position.

3. An agricultural implement according to claim 1, in which said prop means comprises a prop pivotally connected at one end to said one end of said lever and movable to a position in which a part of the prop may engage said frame so as to hold said one end of the lever in a raised position.

4. An agricultural implement according to claim 3, in which said prop has a plurality of projections which extend laterally of the prop and which are engageable with an over-center type latch mounted on said frame, said latch being operable alternatively by two of said projections so as to hold or release the prop in or from said position.

5. An agricultural implement according to claim 1 which includes a plurality of soil-working devices carried by a plurality of said members each of which is pivotally connected to said frame.

References Cited

UNITED STATES PATENTS

| | | | |
|---|---|---|---|
| 2,405,334 | 8/1946 | Silver | 172—318 X |
| 2,553,315 | 5/1951 | Hansen | 172—317 |
| 2,935,146 | 5/1960 | Williams | 172—317 |
| 3,062,561 | 11/1962 | Wulff et al. | 172—9 X |
| 3,194,323 | 7/1965 | Zimmerman | 172—500 |

FOREIGN PATENTS

| | | |
|---|---|---|
| 489,810 | 1/1953 | Canada. |
| 1,146,471 | 11/1957 | France. |

EDGAR S. BURR, Primary Examiner

U.S. Cl. X.R.

172—7, 317